US008403212B2

(12) United States Patent
van Esch

(10) Patent No.: US 8,403,212 B2

(45) Date of Patent: Mar. 26, 2013

(54) METHOD FOR ATTACHING AN INFORMATION CARD TO AN ITEM PACKAGED IN A BLISTER, AN INFORMATION CARD AND A SYSTEM USING THE INFORMATION CARD

(75) Inventor: Jos J. J. M. van Esch, Riethoven (NL)

(73) Assignee: 4C Care & Consultancy BV, Riethoven (NL)

( * ) Notice: Subject to any disclaimer, the term of this patent is extended or adjusted under 35 U.S.C. 154(b) by 124 days.

(21) Appl. No.: 12/598,898

(22) PCT Filed: Apr. 28, 2008

(86) PCT No.: PCT/IB2008/001049

§ 371 (c)(1), (2), (4) Date: Nov. 4, 2009

(87) PCT Pub. No.: WO2008/135825

PCT Pub. Date: Nov. 13, 2008

(65) Prior Publication Data

US 2010/0127073 A1 May 27, 2010

(30) Foreign Application Priority Data

May 5, 2007 (NL) ...................................... 1033806
May 5, 2007 (NL) ...................................... 1033807

(51) Int. Cl.
*G06K 5/00* (2006.01)

(52) U.S. Cl. ......... 235/380; 235/375; 235/487; 206/460

(58) Field of Classification Search .................. 235/380, 235/375, 381, 494, 487; 206/538, 460
See application file for complete search history.

(56) References Cited

U.S. PATENT DOCUMENTS

| | | | | |
|---|---|---|---|---|
| 2006/0144749 | A1* | 7/2006 | Arnold et al. | 206/538 |
| 2006/0202830 | A1* | 9/2006 | Scharfeld et al. | 340/572.7 |
| 2007/0185615 | A1* | 8/2007 | Bossi et al. | 700/244 |
| 2007/0199858 | A1* | 8/2007 | Williams-Hartman | 206/532 |
| 2008/0027291 | A1* | 1/2008 | Williams-Hartman | 600/300 |
| 2008/0272022 | A1* | 11/2008 | Kulkarni et al. | 206/532 |
| 2008/0308445 | A1* | 12/2008 | Dolak | 206/471 |

* cited by examiner

*Primary Examiner* — Edwyn Labaze

(74) *Attorney, Agent, or Firm* — Ryan A. Schneider, Esq.; Troutman Sanders LLP

(57) ABSTRACT

An information card for attaching to a blister holding an item such as a pharmaceutical dose comprises a rim area around an opening in the information card for attaching the information card to the blister, the opening allowing the information card to be positioned around the item. This allows additional information to be added to the blister while leaving the protective blister intact.

36 Claims, 8 Drawing Sheets

METHOD FOR ATTACHING AN INFORMATION CARD TO AN ITEM PACKAGED IN A BLISTER, AN INFORMATION CARD AND A SYSTEM USING THE INFORMATION CARD

BENEFIT CLAIMS

This application is a US National Stage of International Application No. PCT/IB2008/001049, filed 28 Apr. 2008, which claims the benefit of both NL 1033806, filed 4 May 2007, and NL 1033807, filed 4 May 2007.

TECHNICAL FIELD OF THE INVENTION

The invention relates to a method of attaching an information card to an item packaged in a blister, comprising the step of attaching an information card to the blister. The invention further relates to an information card for attaching to a blister holding a dose of a pharmaceutical.

BACKGROUND ART

Pharmaceuticals are being offered in various kinds of packaging. In many cases such packaging holds several doses, such as pills, individually packed but physically interconnected. Each dose can be removed from the packaging at the moment the dose is to be administered.

The packaging has to meet many requirements. The packaging must for instance contain information about the application of the pharmaceutical, and must have a registration number to identify the pharmaceutical, expiration date for quality control, a charge or lot number to allow traceability and often also a barcode for machine readability. The packaging also often provides protection of the pharmaceutical against environmental influences to prevent deterioration between the moment of production and the moment of application (administering).

Because the individual doses of the pharmaceuticals are often small and to allow standardization of production the information is often applied to the external packaging instead of the actual packaging of the dose.

It is desirable, as evident from efforts by pharmacists, to be able to provide the information about the pharmaceutical with each individual dose in order to ensure the correct administering of the pharmaceutical to the patient.

A common type of packaging for one or more doses is a cavity formed around the dose by two layers that are meet around the dose and form a seal where they meet. The dose can be removed from the cavity by applying pressure to one side of the cavity and either forcing the seal apart or fracturing one of the two layers.

Pharmaceuticals are known to be repackaged. In such a repackaging operation either the entire non-severed blister with multiple doses is being inserted into a new external package or the dose is being removed from the blister and put into another blister or a container of another kind.

Attempts have been made to add the desired information to the blister of the individual dose. The amount of information that can be added is directly linked to the area available to apply the sticker to and as such often severely limited. Attempts to solve this problem by repackaging the dose into a larger blister result in problems with quality control requirements since the origin of the pharmaceutical can no longer be established beyond doubt. This further results in liability issues in case of problems arising from the use of the pharmaceutical.

It is an objective of the present invention to provide a method of applying additional information to a pharmaceutical in a blister and at the same time preventing quality control issues.

DISCLOSURE OF INVENTION

The object is achieved in that the method is characterized in that the method comprises the steps of:

attaching an information card to the blister

Characterized in that the method further comprises the steps of:

locating a opening in the information card, positioning the item in the blister in the opening of the information card before attaching the information card to the blister.

By using an information card with an opening, the size of the information card is no longer limited by the size of the blister surrounding the individual dose. As much additional information as desired can be applied to the information card by choosing an appropriately sized information card. This allows the information to be complete which ensures the administering of the correct pharmaceutical to the correct patient.

The blister with the dose is positioned in the opening and is attached to the information card. The opening allows the original functionality and integrity of the blister to be maintained. The information card effectively forms a passe-partout in which the blister is mounted. The blister consequently continues to provide protection of the pharmaceutical against environmental influences to prevent deterioration between the moment of production and the moment of application.

The blister consequently continues to provide protection of the pharmaceutical against environmental influences to prevent deterioration between the moment of production and the moment of application.

There is no need for severing the blister to remove the dose but instead the blister's integrity and functionality is maintained.

The opening further allows inspection of the blister's side that would otherwise be covered by the label and thus the original labeling applied by the manufacturer to the blister remains accessible allowing optimal quality control. Furthermore the blister's predefined way for severing the blister in order to remove the dose is unaffected, i.e. the patient can remove the dose in the familiar way.

An embodiment of the method is characterized in that the blister is a blister sub section of a multi-dose blister obtained by dividing the multi-dose blister comprising multiple individually packed doses into blister subsections.

Pharmaceutical doses are often individually presented to the patient in order to prevent the patient from taking more than the prescribed doses. A blister comprising multiple doses thus poses a risk in that the patient might take more doses than allowed or desired.

By cutting up the blister holding multiple doses into subsection holding fewer doses this risk is greatly reduced.

This is also desirable in hospitals etc since the pharmaceuticals are stored by the hospital and only the required doses are presented to the patient. In case of a blister comprising multiple doses the blister must be returned to the storage location after one or more doses have been removed for administering to the patient. This is not only a burden to the staff but also introduces an additional risk of mixing up two patient's pharmaceuticals.

The method thus allows the addition of the information card to a single dose, still in its subsection of the blister, cut from the blister.

Since the subsection of the blister still provides the full protection to the dose, no special environment or special room is needed as would be the case when the cavity in the blister holding the dose would be severed. If the dose is delivered in a single dose blister from the factory, the division of the blister is of course not required.

In another embodiment of the method a rim of the opening of the information card is provided with glue for attaching the information card to the blister.

Only the rim needs to be provided with glue for gluing the information card to the blister or blister subsection. This provides a defined zone where the blister is bonded to the information card which saves material relative to a situation where a sticker is applied to the blister since a sticker usually has glue applied to its entire back surface.

In another embodiment of the method the information card is attached to a side of the blister designed for releasing the dose from the blister.

Applying pressure to the blister severs that side of the blister designed for releasing the dose from the blister. When the information card is attached to the side designed for releasing the dose it helps in holding and stabilizing the blister when pressure is to be applied to the other side of the blister.

(Surface is better than side)

In another embodiment of the method at least two information cards are connected to each other.

Having two or more information cards connected allows the construction of a strip of information cards that can be handled as one item. This simplifies the use in automated machines for executing the method according to the invention.

It also simplifies the use in a care environment such as a hospital.

In another embodiment of the method the information cards can be disconnected by tearing.

Two information cards can be separated by tearing.

This can be achieved by perforating the section between two cards where they are joined or by other means of weakening this section, such as thinning the information card material.

In another embodiment of the method the two information cards are different and are attached to blisters holding different pharmaceuticals or different sized doses of the same pharmaceutical.

Besides of having the same pharmaceutical in all information cards that are connected, the method also allows the placement of doses of different pharmaceuticals in the information cards. For instance in the case of two information cards being connected, the first information card is attached to a dose of the first pharmaceutical and the second information card is attached to a dose of the second pharmaceutical. The first information card displays the information about the first pharmaceutical and the second information card displays the information about the second pharmaceutical. This allows the strip of information cards to be designed to reflect a sequence of administering of pharmaceuticals, for instance a sequence followed from patient to patient in a ward.

In another embodiment of the method the information card comprises a barcode.

A barcode allows the positive electronic identification of the attached pharmaceutical. The barcode can be read using a barcode reader in or attached to a handheld device and be compared to information in a bar code on a bracelet on the patient's arm, read by the same bar code reader. If a mismatch is detected, for instance by comparing medication data linked to a particular patient and the information card of the medication intended to be administered, and an alarm can be sounded and the administering of the wrong pharmaceutical to the patient can be prevented.

In another embodiment of the method each information card displays the name of the patient to whom the dose in the attached blister is to be administered.

In addition to the barcode, or as a substitute, the name of the patient is printed on the information card. This allows a final check of the correctness of the administering by the member of the medical staff, the physician or the patient himself. This enhances the safety of the medication. Having the name of the patient on the information card, as well as information that is normally only found on the external box in which the blisters are shipped, and still being able to check the manufacturers print on the blister itself provides a very secure system to ensure that the patient only receives the correct pharmaceuticals.

The information card can also show how the pharmaceutical should look making identification by the patient easy. Other information to be displayed include the pharmacist's name and instructions, the physician's name, prescription and instructions, and side effect information so that in an emergency situation all information is available.

In another embodiment of the method all pharmaceuticals in blisters attached to the information cards connected to each other are to be administered to the same patient.

When multiple information cards, and thus pharmaceutical doses, are connected forming a strip of information cards, the strip can be customized for a particular patient.

The strip can contain doses of different pharmaceuticals, which can be placed in the strip in an order that matches the prescribed sequence of administering. Since the sequence and combination of pharmaceuticals is unique for every patient, placing different pharmaceuticals into a multi dose blister cannot be easily achieved in a pharmaceutical plant. The present invention allows personal and unique combinations of pharmaceutical doses to be placed in a strip of information cards for each patient. Providing information about each dose on the information card allows verification of the correctness of the compilation of the strip.

In another embodiment of the method a pick and place machine is used to position the blister in the opening of the information card.

In order to compile such a personal strip for a patient often multiple pharmaceuticals have to be included in the strip. A pick and place machine as known from electronic circuit board assembly can be used to position the doses in the corresponding openings in the information cards. The pick and place machine is able to retrieve different doses from feeding rails, just as it is able to retrieve electronic components from feeding rails.

To increase the safety of the medication, optical recognition, as is already used to verify correct component selection and orientation during assembly of electronic circuit boards, can be used to verify that the picked blister is the correct blister and orientated correctly. After placement in the opening of the information card the optical recognition can also verify the correctness of the placement.

The blister is provided to the pick and place machine temporarily attached to a tape ordinarily used for providing Surface Mount Technology components to the pick and place machine. By using a temporary adhesive to attach the blister to a normal SMT machine supply tape as commonly used with SMT machines there is no need for extensive modifications to the SMT machine.

Just as in a hospital or member with members of the medical staff, the invention can also be used in a home setting or nursing home where the patient, or another person, can within the framework of the invention perform the tasks described in this document as being performed by the member of the technical staff.

The invention will now be described based on figures.

MODES FOR CARRYING OUT THE INVENTION

Figure 1:
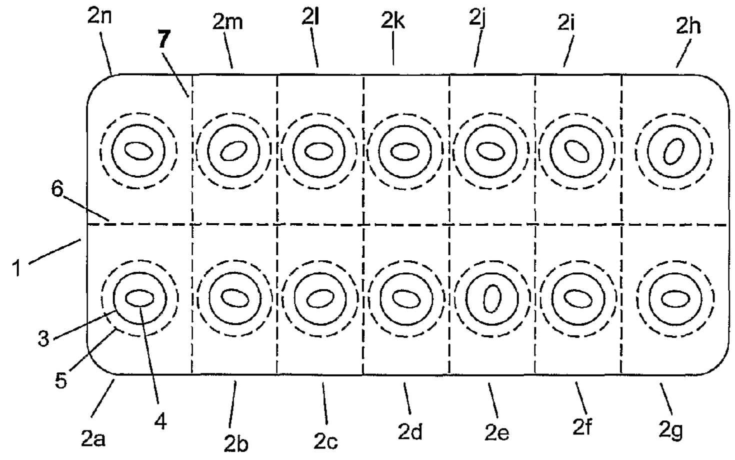
FIG. 1 shows a multi-dose blister.

FIG. 1 shows a multi-dose blister.

The multi-dose blister 1 is known from the prior art. It contains multiple doses of a pharmaceutical (14 shown). The blister 1 can be divided into 14 blister sub sections 2*a*, 2*b*, 2*c*, 2*d*, 2*e*, 2*f*, 2*g*, 2*h*, 2*i*, 2*j*, 2*k*, 2*l*, 2*m*, 2*n* where each blister subsection 2*a*, 2*b*, 2*c*, 2*d*, 2*e*, 2*f*, 2*g*, 2*h*, 2*i*, 2*j*, 2*k*, 2*l*, 2*m*, 2*n* comprises a single dose. In the first blister sub section 2*a* the single dose 4 is located in a cavity 3.

The cavity 3 provides a protection of the dose both from mechanical damage and environmental influences such as humidity. Pharmaceuticals such as the dose 4 are often packaged in the cavity 3 in a strictly controlled environment. This is to ensure that the right pharmaceutical is packaged in the right blister 1 and that the packaging is properly sealed, and that all other requirements and goals commonly known from quality control in the pharmaceutical industry are met. When the multi-dose blister 1 leaves the factory and it's strictly controlled environment a print on one surface of the multi-dose blister 1 allows the identification of the pharmaceutical contained in the blister 1.

FIG. 1 also shows straight dashed lines 6, 7 that indicate perforation lines along which a single dose blister sub section 2*a*, 2*b*, 2*c*, 2*d*, 2*e*, 2*f*, 2*g*, 2*h*, 2*i*, 2*j*, 2*k*, 2*l*, 2*m*, 2*n* can de separated from the rest of the multi dose blister 1. Often multi-dose blisters 1 have such perforated lines but in the case of the present invention both the straight dashed lines 6,7 and the dashed circles 5 indicate how the multi-dose blister 1 can be divided into single dose blister sub section 2*a*, 2*b*, 2*c*, 2*d*, 2*e*, 2*f*, 2*g*, 2*h*, 2*i*, 2*j*, 2*k*, 2*l*, 2*m*, 2*n* before being attached to an information card. Other shapes are of course also possible as long as the cavity 3 is not severed and sufficient surface area remains for attaching the single dose blister sub section 2*a*, 2*b*, 2*c*, 2*d*, 2*e*, 2*f*, 2*g*, 2*h*, 2*i*, 2*j*, 2*k*, 2*l*, 2*m*, 2*n* to an information card.

Figure 2:
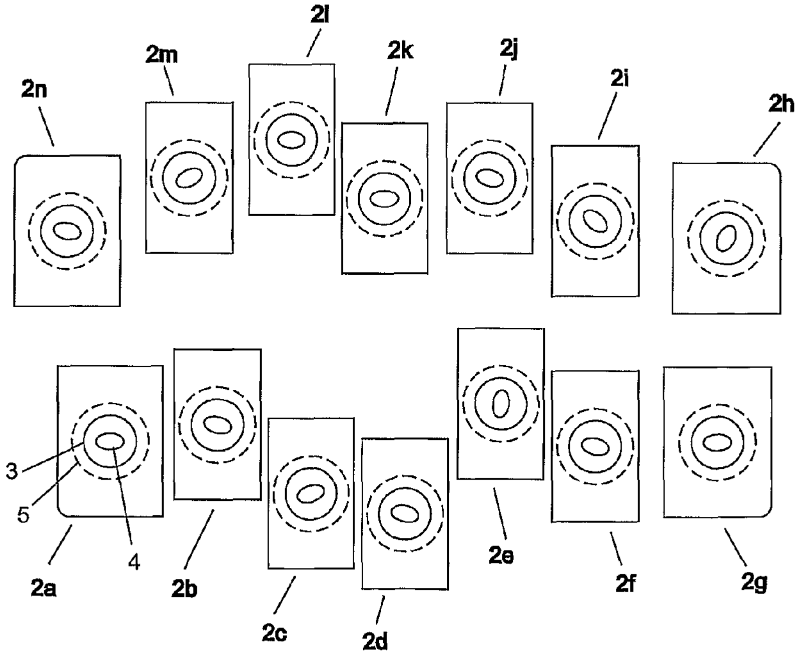
FIG. 2 shows rectangular blister sub sections obtained by cutting the multi-dose blister.

FIG. 2 shows rectangular blister sub sections obtained by cutting the multi-dose blister.

When the multi-dose blister 1 is divided along the straight dashed lines 6,7 of FIG. 1 the single dose blister sub sections 2*a*, 2*b*, 2*c*, 2*d*, 2*e*, 2*f*, 2*g*, 2*h*, 2*i*, 2*j*, 2*k*, 2*l*, 2*m*, 2*n* as shown in FIG. 2 result. The area of the single dose blister sub sections 2*a*, 2*b*, 2*c*, 2*d*, 2*e*, 2*f*, 2*g*, 2*h*, 2*i*, 2*j*, 2*k*, 2*l*, 2*m*, 2*n* minus the area of the cavity 3 can be used to attach the single dose blister sub sections 2*a*, 2*b*, 2*c*, 2*d*, 2*e*, 2*f*, 2*g*, 2*h*, 2*i*, 2*j*, 2*k*, 2*l*, 2*m*, 2*n* to the information card (not shown).

Figure 3:
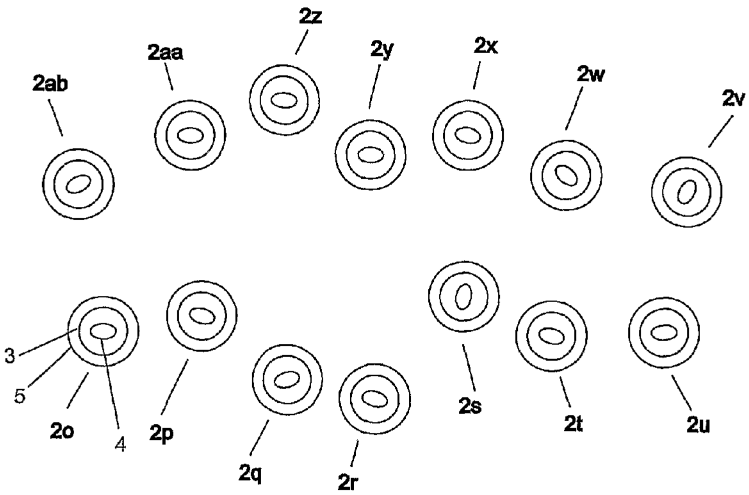
FIG. 3 shows circular blister sub section obtained by cutting the multi-dose blister.

FIG. 3 shows circular blister sub section obtained by cutting the multi-dose blister.

When the single dose blister sub sections are obtained by punching out circles from the multi-dose blister 1 along the circular dashed lines 5 of FIG. 1, the single dose blister sub sections 2*o*, 2*p*, 2*q*, 2*r*, 2*s*, 2*t*, 2*u*, 2*v*, 2*w*, 2*x*, 2*y*, 2*z*, 2*aa*, 2*ab* as shown in FIG. 3.

The area between the outer edge 5 and the cavity 3 is available for attaching the single dose blister sub sections 2*o*, 2*p*, 2*q*, 2*r*, 2*s*, 2*t*, 2*u*, 2*v*, 2*w*, 2*x*, 2*y*, 2*z*, 2*aa*, 2*ab* to the information card (not shown).

Figure 4:
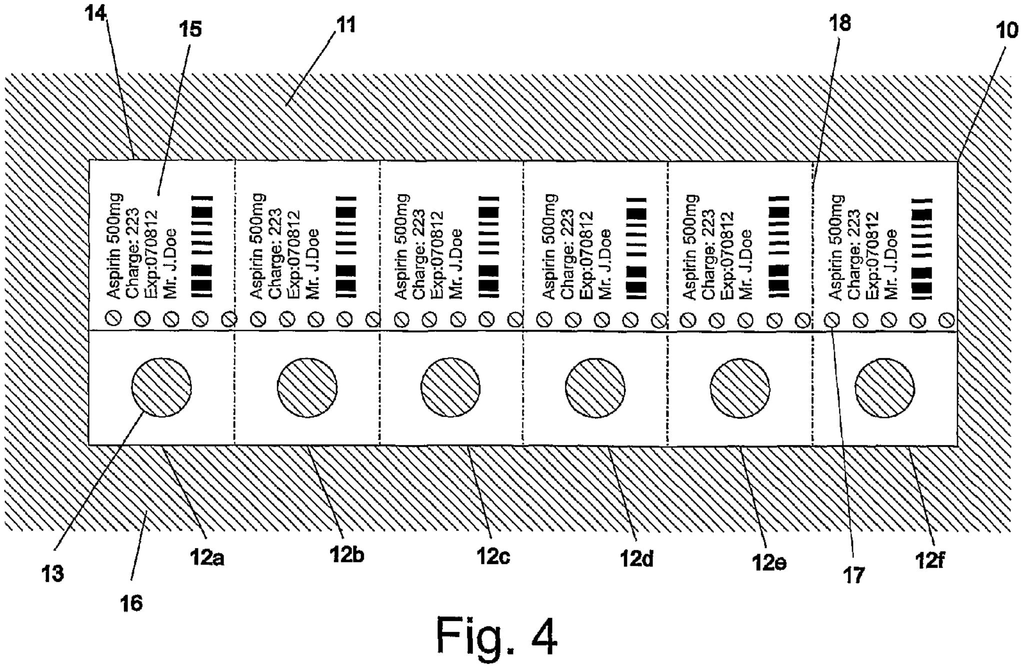
FIG. 4 shows a strip of connected empty information cards.

FIG. 4 shows a strip of connected empty information cards.

For clarity reason the strip 10 of connected empty information cards is shown against a background 11 so that it becomes clear what areas are cut-outs 13, 17. The strip comprises multiple information cards 12*a*, 12*b*, 12*c*, 12*d*, 12*e*, 12*f* that are inter-connected to form a single strip 10. Each information card 12*a*, 12*b*, 12*c*, 12*d*, 12*e*, 12*f* has an opening 13 (shown in all information card but only labeled on the first information card 12*a*) where a single dose blister sub section (or, of course, a single dose blister that was manufactured as a single dose blister in the first place instead of being cut-out from a multi-dose blister) can be attached to the information card 12*a*. Each information card 12*a*, 12*b*, 12*c*, 12*d*, 12*e*, 12*f* is also provided with a labeling area 15 (again, only shown for the first information card 12*a* for clarity reasons) where information about the pharmaceutical or the patient can be printed to be displayed.

As shown, the information can comprise the name of the pharmaceutical, tracking information, expiry date, name of the target patient to whom the dose is to be administered, and a bar code to allow machine reading of the information for tracking from the factory until dose reaches the patient.

Often the surface of multi-dose blisters does not provide sufficient room to display all this information. In addition the surface is often unsuitable for adding information outside the factory due to poor ink adhesion etc, regardless of the available area.

By attaching an information card 12*a*, 12*b*, 12*e*, 12*d*, 12*e*, 12*f* to the blister sub section, not only the useable area can be increased as desired to accommodate any information needed, but also a material can be chosen that allows information to be printed on the information cards using common inks and printers because the material of which the information card is made does not provide protection to the single dose sub section, hence allowing a greater degree of freedom in selecting the information card material.

Other information that can be included on the information card 12*a*, 12*b*, 12*c*, 12*d*, 12*e*, 12*f* includes instructions for use or predetermined times and dates the pharmaceutical should be administered, all individually catered to a particular patient. Alternatively to printing directly on the information card 12*a*, 12*b*, 12*c*, 12*d*, 12*e*, 12*f* the information can be printed on a label, e.g. a sticker, which is in turn attached to the information card.

The individual information cards 12*a*, 12*b*, 12*c*, 12*d*, 12*e*, 12*f* can be separated from the strip 10 by reducing the information card's material strength and thus creating a tear-off or break-off line 18. For use in drug dispensers the strip 10 can be provided with a series of sprocket holes 17 or other means for the drug dispenser to engage the strip 10.

Figure 5:
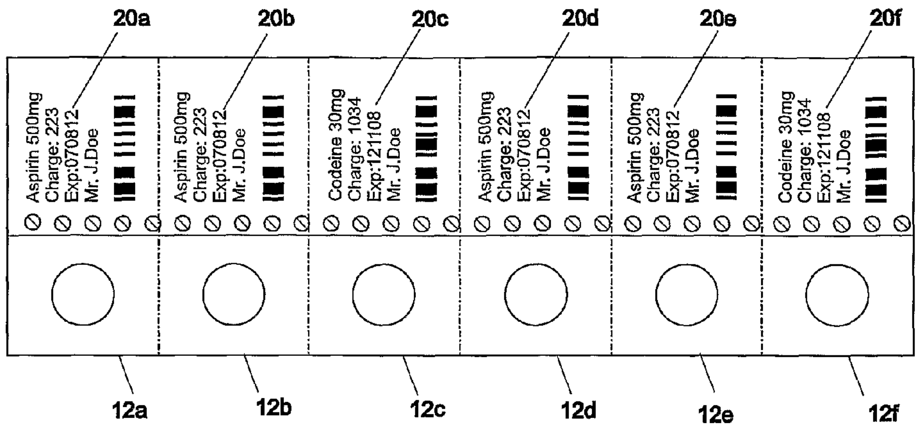
FIG. 5 shows a strip for a single patient containing a mix of pharmaceuticals.

FIG. 5 shows a strip for a single patient containing a mix of pharmaceuticals.

The information cards 12*a*, 12*b*, 12*c*, 12*d*, 12*e*, 12*f* are labeled in FIG. 5 to receive different pharmaceuticals. The information 20*a*, 20*b*, 20*c*, 20*d*, 20*e*, 20*f* displayed by each information card 12*a*, 12*b*, 12*c*, 12*d*, 12*e*, 12*f* is allowed to differ but the patient's name stay the same. Such a strip allows the distribution of a strip of pharmaceuticals to the patient for instance in the morning, containing all the pharmaceuticals he needs to take during the day, further allowing the sequence and time for administering to be prescribed by the label on each information card 12*a*, 12*b*, 12*c*, 12*d*, 12*e*, 12*f* and/or by the physical sequence of the pharmaceuticals in the strip.

The strip can thus be individually prepared for the patient, which cannot be achieved in a large pharmaceutical factory.

Figure 6:
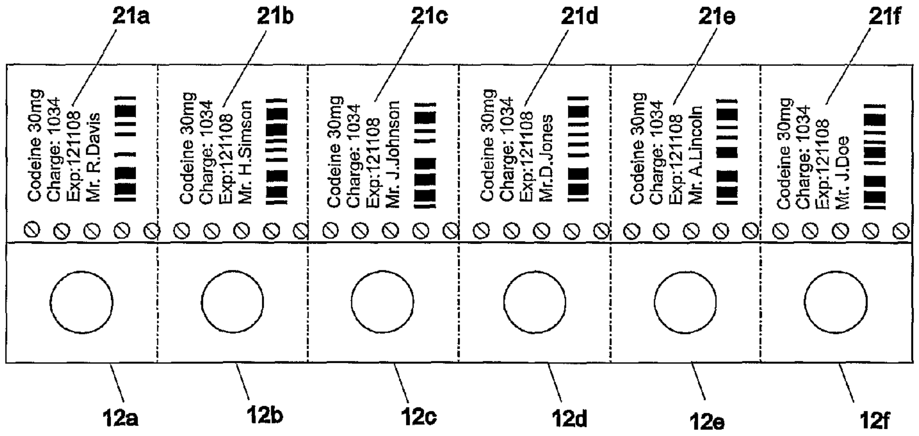
FIG. 6 shows a strip for multiple patients.

FIG. 6 shows a strip for multiple patients.

The information cards 12*a*, 12*b*, 12*c*, 12*d*, 12*e*, 12*f* are labeled in FIG. 6 to receive the same pharmaceuticals. The information 20*a*, 20*b*, 20*c*, 20*d*, 20*e*, 20*f* displayed by each information card 12*a*, 12*b*, 12*c*, 12*d*, 12*e*, 12*f* shows the same pharmaceutical to be attached to the information card 12*a*, 12*b*, 12*c*, 12*d*, 12*e*, 12*f* but shows different patient names. Such a strip allows the distribution of a strip of pharmaceuticals to a ward with multiple patients receiving the same medication. The member of the medical staff in the ward can then take the strip and distribute the individual sections to the appropriate patients or use the strip and expel the pharmaceutical at the patient's bed side. When returning from her round the empty positions in the strip form positive evidence that patient received the pharmaceutical. Also, having the patient's name on the information card 12*a*, 12*b*, 12*c*, 12*d*, 12*e*, 12*f* allows verification by the patient that he is being administered the correct pharmaceutical.

The strip can thus be individually prepared for a ward, which cannot be achieved in a large pharmaceutical factory. It enhances the efficiency of the work in the ward and provides additional checks against incorrect administering of drugs in the ward. It is self evident that various combinations can be made beyond FIGS. 4, 5 and 6, for instance a strip can be tailored for a ward like in FIG. 6 while at the same time allowing different pharmaceuticals to be included in the strip for the same patient as in FIG. 5. The sequence of patients on the strip can be matched to the sequence in which the member of the medical staff makes her round in the ward.

Figure 7:
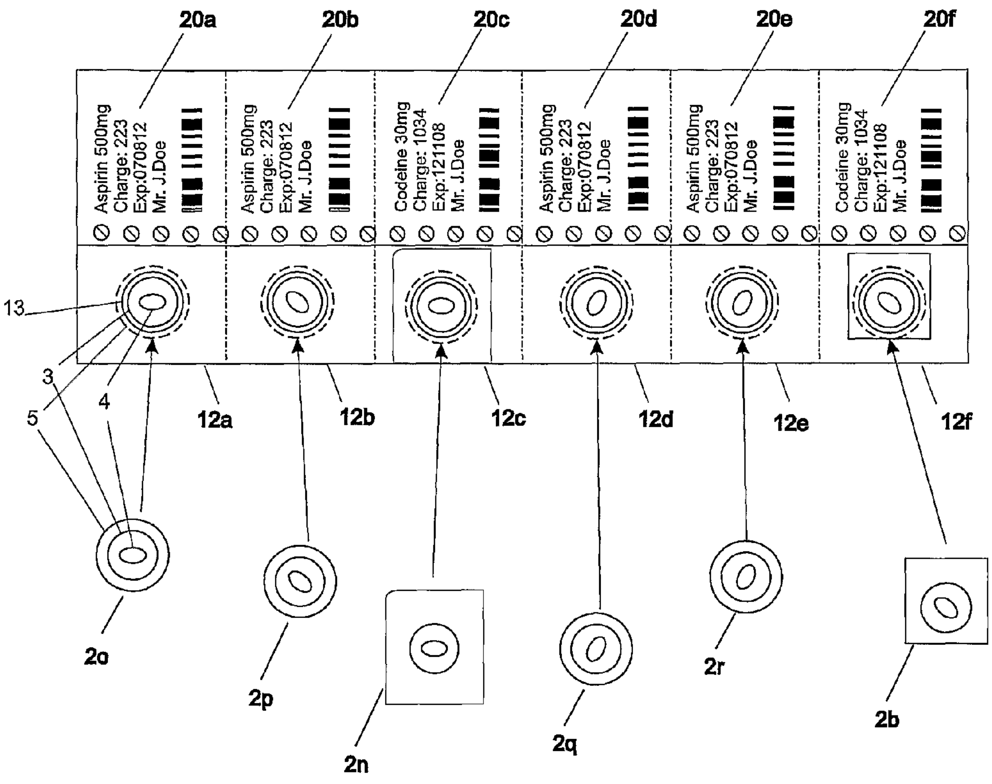
FIG. 7 shows the loading of the strip of information cards with blister subsections.

FIG. 7 shows the loading of the strip of information cards with blister subsections.

The strip shown in FIG. 7 has the same configuration as the strip shown in FIG. 5. Different types of pharmaceuticals in their blister sub sections 2*o*, 2*p*, 2*n*, 2*q*, 2*r*, 2*b* are shown separately as obtained by separating the blister sub sections 2*o*, 2*p*, 2*n*, 2*q*, 2*r*, 2*b* from the multi-dose blister as explained in FIGS. 1, 2 and 3. In addition, the same blister sub sections 2*o*, 2*p*, 2*n*, 2*q*, 2*r*, 2*b* are shown when attached to the corresponding information cards 12*a*, 12*b*, 12*c*, 12*d*, 12*e*, 12*f*. The blister sub section 2*o*, 2*p*, 2*q* and 2*r* contain a dose of aspirin and are attached into the corresponding information cards 12*a*, 12*b*, 12*d*, 12*e*, while the blister sub sections 2*b*, 2*n* contain codeine and are attached to their corresponding information cards 12*c*, 12*f*.

A sequence of administering the pharmaceuticals for Mr. J. Doe as indicated by the strip is aspirin, aspirin, codeine, aspirin, aspirin, codeine.

It is clear from FIG. 7 that the information card 12*a*, 12*b*, 12*c*, 12*d*, 12*e*, 12*f* provides an additional advantage in that it allows differently shaped blister sub section 2*o*, 2*p*, 2*n*, 2*q*, 2*r*, 2*b* to be attached to the same information cards. It is evident that the opening 13 must be large enough to accommodate the pharmaceutical and any part of the blister sub section 2*o*, 2*p*, 2*n*, 2*q*, 2*r*, 2*b* that has an elevated profile and that there must be some overlap between the rim of the opening 13 and the blister sub section 2*o*, 2*p*, 2*n*, 2*q*, 2*r*, 2*b* in order to be able to attach the blister sub section 2*o*, 2*p*, 2*n*, 2*q*, 2*r*, 2*b* to the information card 12*a*, 12*b*, 12*c*, 12*d*, 12*e*, 12*f*. As is shown in FIG. 7 both circular cut out blister sub sections 2*o*, 2*p*, 2*q*, 2*r*, as well as rectangular cut out blister sub sections 2*b*, 2*n* can be accommodated by the same opening.

Strips with differently shaped openings can be provided so that various blister sub section shapes and sizes can be accommodated.

The first information card 12*a* with the attached blister sub section 2*o* indicates how the blister sub section 2*o* is attached to the information card 12*a*. The cavity 3 holding the pharmaceutical dose 4 is positioned in the opening 13. The outer edge 5 of the blister sub section 2*o* overlaps with the information card 12*a*, i.e. the hole 13 is smaller than the blister sub section 2*o*, but large enough to either let pressure be applied to the dose (for instance pill or capsule) or to let the dose pass through the opening when being expelled from the cavity.

Figure 8:
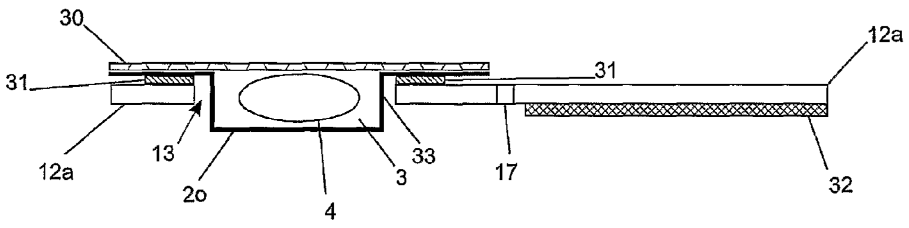
FIG. 8 shows a cross section of an information card attached to the top of a blister sub section.

FIG. 8 shows a cross section of an information card attached to the top of a blister sub section.

Typical blisters for packing pharmaceutical doses have two surfaces 30, 33 of which typically a first surface 33 is designed to exercise force on the dose 4 to expel the dose 4 through the second surface 30. FIG. 8 shows a first option to attach the information card 12*a* to the top of blister sub section 2*o*. In order to attach the information card 12*a* the rim around the hole 13 is provided with an adhesive 31. FIG. 8 further shows the sprocket hole 17 for use of the strip in a medication dispenser. Also shown is a sticker 32 attached to the information card 12*a* carrying the information about patient and pharmaceutical. Instead of using a sticker 32 the area indicated can also be used for printing the information directly on the information card 12*a*.

It is self evident that the label 32 can also be affixed to the opposite site of the information card 12*a*, preferably taking care not to cover the blister sub section surface 30 through which the dose 4 is to be expelled from the cavity 3.

Affixing the label 32 on that side of the information card 12*a* where the information on the blister 2*o* is visible has the advantage of easy comparison of the information on the information card 12 and the information on the blister 2*o*.

Affixing the label 32 such that the dose 4 cannot be expelled without damaging the label 32 and at the same time proving the label 32 with an adhesive that allows the label to be removed from the information card 12*a*, improves traceability of the administering of the dose 4 as the member of the medical staff is obliged to remove the label 32 before expelling the dose 4, after which the label can be affixed to a report list proving that the dose 4 has actually been presented to the patient. Positioning the label 32 in this way also assists in attaching the blister sub section 2*o* to the information card 12*a*.

Figure 9:
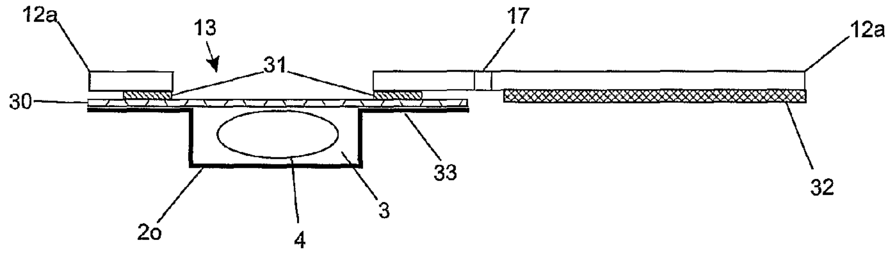
FIG. 9 shows a cross section of an information card attached to the bottom of a blister subsection.

FIG. 9 shows a cross section of an information card attached to the bottom of a blister subsection.

FIG. 9 shows a second option to attach the information card 12*a* to the bottom of blister sub section 2*o*. In order to attach the information card 12*a* the rim around the hole 13 is provided with an adhesive 31.

This second option has the advantage of using the structural strength of the information card 12*a* to support the blister sub section when applying force to the cavity 3 to expel the dose 4. The adhesive 31 does not have to provide as much adhesion as in the first option which allows a cheaper adhesive, or alternative mechanical means to be used. FIG. 9 further shows the sprocket hole 17 for use of the strip in a medication dispenser. Also shown is a label 32 attached to the information card 12*a* carrying the information about patient and pharmaceutical. Instead of using a sticker 32 the area indicated can also be used for printing the information directly on the information card 12*a*.

It is self evident that the label 32 can also be affixed to the opposite site of the information card 12*a*, preferably taking care not to cover the blister sub section surface 30 through which the dose 4 is to be expelled from the cavity 3.

Affixing the label 32 on that side of the information card 12*a* where the information on the blister 2*o* is visible has the advantage of easy comparison of the information on the information card 12 and the information on the blister 2*o*.

Affixing the label 32 such that the dose 4 cannot be expelled without damaging the label 32 and at the same time proving the label 32 with an adhesive that allows the label 32 to be removed, improves traceability of the administering of the dose 4 as the member of the medical staff is obliged to remove the label 32 before expelling the dose 4, after which the label 32 can be affixed to a report list proving that the dose 4 has actually been presented to the patient.

The original manufacturer's protection of the medical dose remains intact by punching or cutting the individual cavities holding the doses from the multi-dose blister. The integrity of the cavity and consequently the protection is maintained.

Because of the division into blister sub sections the present invention does not repackaged the dose as the dose remains in it's original protective cavity, it merely changes the size and shape of the multi-doe blister. The result is that the manufacturer's traceability and warranty are unaffected and expensive investigations into possible changes in expiration date are avoided. The division of the multi-dose blister and the attachment of the blister sub sections to the information cards can be performed in a standard room without expensive investments in air treatment.

The blister sub sections are transported by means of vibration to a Surface Mount Technology pick and place machine. Using the SMT pick and place machine the blister sub sections are positioned in the opening of the information card.

Figure 10:
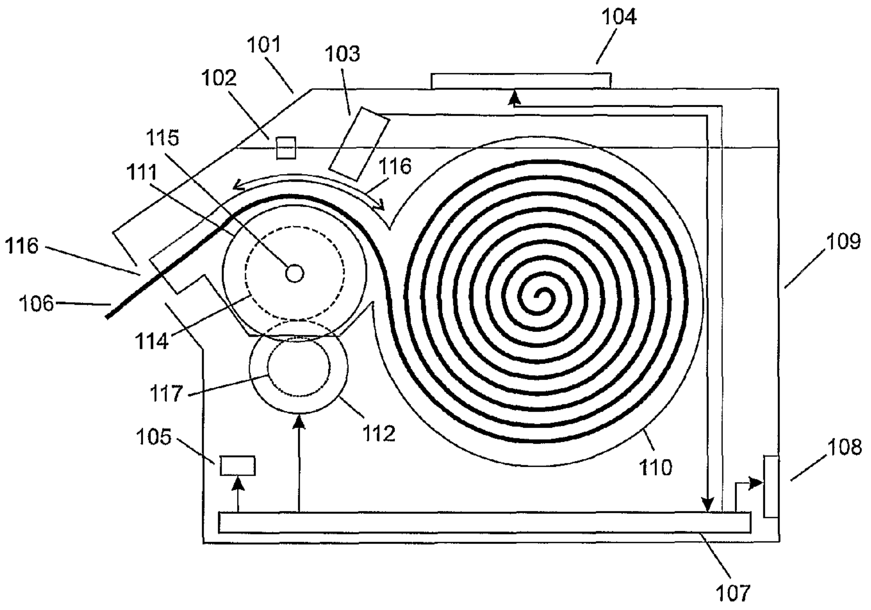
FIG. 10 shows a dose dispenser for use with the present invention.

FIG. 10 shows a dose dispenser for use with the present invention.

The dose dispenser 109 comprises a container 110 holding the strip of information cards 106, or another suitable carrier 106 such as interconnected bags or blisters, in a rolled-up form to be dispensed through a dispenser opening 116. The container 110 simplifies the insertion of the roll containing the pharmaceutical packaging into the dose dispenser 109. The dose dispenser 109 further comprises a lid 101 for access to the innards of the dose dispenser and can be provided with a lock 102 for preventing removal of or tampering with the container 110.

An optional digital scanner 103 allows one form of control of the dispensing process by scanning the information on the carrier 106, for instance of the bar code on the information card of the present invention. The carrier 106 is advanced so that it emerges from the dose dispenser 109 and becomes accessible for the user, for instance member of the medical staff or patient. The advancement of the carrier 106 can be achieved by manual operation or by means of gear 112 coupled to an electric motor 117. The gear 112 engages with a container gear 114 comprised in the container 110 which in turn is coupled to a sprocket 111 for driving the carrier 106. For this, the carrier 106 is provided with openings as shown in the description of the information cards. The sprocket 111 engages with the openings in the carrier 106, allowing the electric motor to drive the carrier 106 forward or backward.

The dose dispenser 109 can be provided with a display/keyboard unit 104 and a speaker 105 for interacting with the user. The display 104 can display the patients name, name of pharmaceutical or indicate when the dispensed pharmaceutical has to be administered.

The container gear and the sprocket 111 are positioned inside the container and are exchanged together with the container 109.

The gear 112 and the container gear 114 can be replaced by other drive means that can be easily decoupled such as two wheels that are coupled by friction.

The motor, digital scanner 103 and the display/keyboard unit 104 are coupled to and controlled by the controller 107. The controller 107 comprises an interface 108 which can be connected to a network for interfacing to a computer which comprises for instance a database of pharmaceuticals and/or patients.

Figure 11:
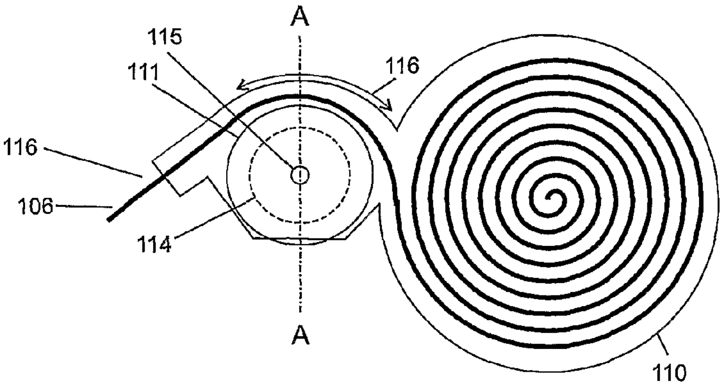
FIG. 11 shows a container for holding strips of information cards.

FIG. 11 shows a container for holding strips of information cards

The container 110 comprises a storage area 113 where the carrier 106 is stored, for instance rolled up in order to save space and to facilitate orderly dispensing of the carrier 106.

The container 110 comprises means to drive the carrier 106 forward and backward. The backward motion is used when the dose dispenser detects that the carrier 106 has not been taken by the user. Backward motion allows the carrier section exposed outside the dose dispenser to be retracted into the dose dispenser to reduce the opportunity for other persons to take the carrier 106.

The drive means can comprise a sprocket 111 for engaging with the carrier 106 and a container gear 114, the sprocket 111 being coupled to the container gear 114 for instance via an axle 115. The axle 115, in addition to coupling the container gear 114 and the sprocket 111, also positions the container gear/sprocket assembly in the container. For this the container has holes of cavities in which the axle is held and positioned.

In order to ensure positive engagement between the sprocket 111 and the carrier 106 the container comprises a curved area forming an arc 116 of which the center coincides with the center of the sprocket 111. This ensures that more than one sprocket tooth/sprocket hole engagement is achieved.

The container can be provided with a lock 117 that prevents access to the pharmaceuticals in the container by providing a tamperproof seal. Another lock 117 envisaged prevents the rotation of the container gear 114/sprocket 111 assembly until the container 109 will be used. Even if the dispensing opening 116 is accessible, the sprocket 111 being locked ensures that no carrier 106 can be retrieved from the container 1009 until the lock 117 is removed. Removal of the lock 117 can be detected and the container 109 can be rejected based on potential tampering.

Figure 12:
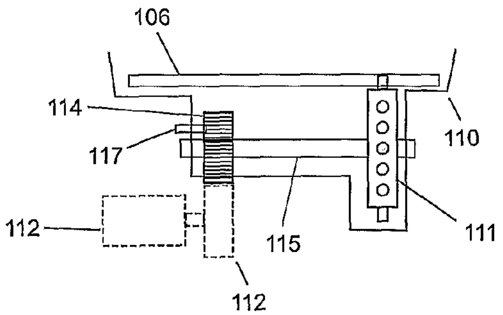
FIG. 12 shows a closed loop system in which the information cards are used.

FIG. 12 shows the front view of the cross section A-A indicated in figure of FIG. 11. It show the possible positioning of the Axle 115, sprocket 111, container gear 114 and lock 117, and also indicates the electric motor 112 and the engagement between the drive gear 112 and the container gear 114.

Figure 13:
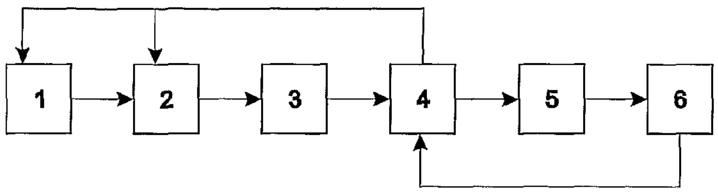

FIG. 13 shows a closed loop system in which the information cards are used.

The closed loop system comprises 6 states.

At state 1 the physician writes a prescription for patient A.

At state 2 the pharmacist checks the prescription

At stage 3 the ward plans the distribution of pharmaceuticals and orders the pharmaceuticals from the pharmacist.

At stage 4 the pharmaceutical is packaged, for instance using the information cards of the present invention. The corresponding data, such as patient information and prescription information is stored in a data base on a server.

At stage 5 the member of the medical staff takes the pharmaceuticals to the patient.

At stage 6 the administering is registered using a barcode (or RFID means), linking administered pharmaceutical and patient and verifying using the data base whether the administering is correct.

At stage 7 the correct administering is verified by comparing data in the database to the data obtained during the administering of the pharmaceutical.

Consequently the process of prescribing and administering drug, i.e. pharmaceuticals forms a closed loop including verification.

The loop is closed by feedback about the administering to the database.

As an extension of this, the feedback information in the database is also available to the physician and the pharmacist, allowing further verification that the process was executed correctly. This enhances the safety of the administering process.

Instead of pharmaceuticals, other small packaged items can be attached to the information card of the present invention. Small electronic parts are often provided by the manufacturer on large rolls comprising thousands of parts. This may be satisfactory for use in large scale assembly but is very cumbersome for use in a development laboratory environment. The labeling on the components are very small or even absent while the blister in which they are packaged is also too small for part numbers, resulting in only the spool carrying the data about the type of component. The information card of the present invention allows an appropriate labeling of small quantities of components and at the same time allows the components to be retrieved from the blister cavity in the usual manner.

The invention claimed is:

1. A method of attaching an information card to an item packaged in a blister, comprising:

locating an opening of an information card for accommodating a blister;

aligning an item packaged in the blister with the opening of the information card; and attaching the information card to the blister so that the item in the blister is positioned in the opening of the information card.

2. A method as claimed in claim 1, wherein the blister is a blister sub section of a multi-dose blister obtained by dividing the multi-dose blister comprising multiple individually packed doses into blister subsections.

3. A method as claimed in claim 1, wherein a rim of the opening of the information card is provided with adhesive for attaching the information card to the blister.

4. A method as claimed in claim 3, wherein the information card is attached to a side of the blister designed for releasing the dose from the blister.

5. A method as claimed in claim 1, wherein two information cards are connected to each other.

6. A method as claimed in claim 5, wherein the two information cards can be disconnected by tearing.

7. A method as claimed in claim 5, wherein the two information cards carry different information and are attached to blisters holding different pharmaceuticals.

8. A method as claimed in claim 5, wherein the two information cards carry different information and are attached to blisters holding different sized doses of the same pharmaceutical.

9. A method as claimed in claim 1, wherein the blister comprises a pharmaceutical dose.

10. A method as claimed in claim 1, wherein the information card comprises a barcode.

11. A method as claimed in claim 1, wherein an information card comprises the name of the patient to whom the dose in the attached blister is to be administered.

12. A method as claimed in claim 1, wherein all pharmaceuticals in blisters attached to the information cards connected to each other are to be administered to the same patient.

13. A method as claimed in claim 1, wherein positioning the blister in the opening of the information card is performed with a pick and place machine.

14. A method as claimed in claim 1, wherein the blister comprises an electronic component.

15. An information card for attaching to a blister holding an item, wherein the information card comprises a rim area around an opening of the information card for attaching the information card to the blister, the opening allowing the information card to be positioned around the item.

16. An information card as claimed in claim 15, wherein the opening is dimensioned to allow positioning of the opening around a standard sized item.

17. An information card as claimed in claim 15, wherein the rim area of the opening of the information card is provided with glue for attaching the information card to the blister.

18. An information card as claimed in claim 17, wherein the information card is designed to be attached to a side of the blister designed for releasing the item from the blister.

19. An information card as claimed in claim 15, wherein the information card is connected to a second information card.

20. An information card as claimed in claim 19, wherein the information card can be disconnected from the second information card by tearing.

21. An information card as claimed in claim 15, wherein the blister comprises a pharmaceutical dose.

22. An information card as claimed in claim 19, wherein the information card and the second information card comprise different information.

23. An information card as claimed in claim 15, wherein the information card comprises a barcode.

24. An information card as claimed in claim 15, wherein the information card comprises an RFID device.

25. An information card as claimed in claim 15, wherein the information card comprises a patient's name.

26. An information card as claimed in claim 15, wherein the information cards connected to each other all comprise the same patient's name.

27. An information card as claimed in claim 15 further comprising positioning means to position the information card in guide or transport rail for use with a pick and place machine.

28. An information card as claimed in claim 15, wherein the blister comprises an electronic component.

29. Use of a surface mount technology pick and place machine to position the blister in the opening of the information card as claimed in claim 15.

30. A dose dispenser for use with the information card as claimed in claim 15.

31. A closed loop-system for verifying correct administering of a pharmaceutical comprising:

a data base comprising prescription information, medication retrieval means for retrieving information from an information card as claimed in claim 15, patient identity retrieval means for identifying a patient, and comparing means for comparing information retrieved by the medication retrieval means, by the patient identity retrieval means and from the database, to establish correct administering when the compared information matches.

32. A method of attaching an information card to an item packaged in a blister comprising:

providing a plurality of single dose blisters, each single dose blister comprising a sealed cavity containing a single dose item;

providing a strip of inter-connected information cards, each information card having a first area with an opening therein and a labeling area adjacent the first area, wherein the labeling area carries information relating to an item; and for each information card in said strip, attaching one of said single dose blisters to the first area of said information card, aligned with the opening in said first area.

33. The method according to claim 32, wherein the step of providing a plurality of single dose blisters comprises:

providing a multidose blister, the multidose blister comprising a plurality of interconnected blister sections, each blister section comprising a sealed cavity containing a single dose item; and separating the independent blister sections from each other.

34. The method according to claim 32 further comprising separating at least one of said information cards from the strip.

35. The method according to claim 32, wherein at least two labeling areas carry mutually the same information, and wherein the two single dose blisters attached to the two first areas corresponding to said two labeling areas contain mutually identical items in their respective cavities.

36. The method according to claim 32 wherein at least two labeling areas carry mutually different information, and wherein the two single dose blisters attached to the two first areas corresponding to said two labeling areas contain mutually different items in their respective cavities.

* * * * *